United States Patent
McDonough et al.

(10) Patent No.: US 8,941,741 B1
(45) Date of Patent: Jan. 27, 2015

(54) AUTHENTICATION USING A VIDEO SIGNATURE

(71) Applicant: FMR LLC, Boston, MA (US)

(72) Inventors: John C. McDonough, Nahant, MA (US); Jonathan Hromi, Watertown, MA (US); Hadley Rupert Stern, West Newton, MA (US); Dmitry Bisikalo, Framingham, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/224,901

(22) Filed: Mar. 25, 2014

(51) Int. Cl.
  *H04N 7/18* (2006.01)
  *G06K 9/00* (2006.01)
  *G10L 17/00* (2013.01)

(52) U.S. Cl.
  CPC .......... *G06K 9/00288* (2013.01); *G10L 17/005* (2013.01)
  USPC .......................................... 348/161; 382/118

(58) Field of Classification Search
  CPC .......... G06K 9/00228; G06K 9/00221; G06K 9/00288; G06K 9/741; G06Q 30/0225; G06Q 30/02; H04L 63/08; H04L 63/0428; G01B 11/022
  USPC ................ 348/161; 705/14.26; 713/168, 176; 380/202; 382/118
  See application file for complete search history.

(56) References Cited

U.S. PATENT DOCUMENTS

| | | | |
|---|---|---|---|
| 7,805,377 B2* | 9/2010 | Felsher | 705/64 |
| 2003/0070072 A1* | 4/2003 | Nassiri | 713/168 |
| 2004/0131184 A1* | 7/2004 | Wu et al. | 380/202 |
| 2004/0153648 A1* | 8/2004 | Rotholtz et al. | 713/176 |
| 2009/0171850 A1 | 7/2009 | Yuval | |
| 2009/0232364 A1* | 9/2009 | Hosoi | 382/118 |
| 2010/0083353 A1 | 4/2010 | Wang | |
| 2012/0278155 A1* | 11/2012 | Faith | 705/14.26 |

OTHER PUBLICATIONS

Cheng, et al "Video-based signature verification and pen-grasping posture analysis for user-dependent identification authentication", IEEE Xplore Computer Vision, IET vol. 6, Issue: 5, Sep. 2012, 2 pages.

* cited by examiner

*Primary Examiner* — Gims Philippe
(74) *Attorney, Agent, or Firm* — Proskauer Rose LLP

(57) ABSTRACT

Methods and apparatuses, including computer program products, are described for authentication using a video signature. A computing device receives a request to access a secure resource, and the request includes a first video segment comprising a plurality of visual and audio elements. The computing device analyzes one or more of the plurality of visual and audio elements in the first video segment to determine a value associated with each of the one or more analyzed elements. The computing device calculates a total score for the first video segment based upon the value associated with each of the one or more analyzed elements. The computing device compares the total score for the first video segment to a score associated with a second video segment associated with the computing device. The computing device determines whether access to the secure resource is permitted based upon the comparison step.

26 Claims, 6 Drawing Sheets

AUTHENTICATION USING A VIDEO SIGNATURE

FIELD OF THE INVENTION

This application relates generally to methods and apparatuses, including computer program products, for authentication using a video signature.

BACKGROUND

Typical authentication mechanisms, such as username/password combinations, are susceptible to theft, spoofing, phishing, and other forms of fraudulent activity by impostors seeking access to a user's secure accounts or resources (e.g., websites, documents, databases). More robust authentication techniques, like biometric scanning, have not yet become widely available and can depend significantly on both the type of technology available to a user and the type of technology used by an entity monitoring access to a secure resource.

Many computing devices, especially mobile devices, are equipped with cameras that can be used to record and transmit video segments (e.g., still images, video clips). Video segments typically incorporate a variety of visual and audio elements that can be used to uniquely identify the video segment in question from other video segments.

SUMMARY OF THE INVENTION

Therefore, what is needed are methods and systems to leverage the video capture capability of computing devices to generate a video signature used in authenticating a user and/or computing device to a secure resource. The techniques described herein provide the advantage of generating a video signature through analysis of a user-created and submitted video segment that includes a plurality of distinct visual and audio elements, where the plurality of elements are analyzed to calculate a total score for the video segment. A video segment, submitted by a user and assigned a score, can be used as a video signature to authenticate subsequent attempts to access the secure resource, e.g., by comparing the visual and audio elements in a later-submitted video segment against the video signature associated with a previously-submitted video segment.

The invention, in one aspect, features a method for authentication using a video signature. A computing device receives a request to access a secure resource, and the request includes a first video segment comprising a plurality of visual and audio elements. The computing device analyzes one or more of the plurality of visual and audio elements in the first video segment to determine a value associated with each of the one or more analyzed elements. The computing device calculates a total score for the first video segment based upon the value associated with each of the one or more analyzed elements. The computing device compares the total score for the first video segment to a score associated with a second video segment associated with the computing device. The computing device determines whether access to the secure resource is permitted based upon the comparison step.

The invention, in another aspect, features a system for authentication using a video signature. The system includes a computing device configured to receive a request to access a secure resource, and the request includes a first video segment comprising a plurality of visual and audio elements. The computing device is configured to analyze one or more of the plurality of visual and audio elements in the first video segment to determine a value associated with each of the one or more analyzed elements. The computing device is configured to calculate a total score for the first video segment based upon the value associated with each of the one or more analyzed elements. The computing device is configured to compare the total score for the first video segment to a score associated with a second video segment associated with the computing device. The computing device is configured to determine whether access to the secure resource is permitted based upon the comparison step.

The invention, in another aspect, features a computer program product, tangibly embodied in a non-transitory computer readable storage medium, for authentication using a video signature. The computer program product includes instructions operable to cause a computing device to receive a request to access a secure resource, and the request includes a first video segment comprising a plurality of visual and audio elements. The computer program product includes instructions operable to cause the computing device to analyze one or more of the plurality of visual and audio elements in the first video segment to determine a value associated with each of the one or more analyzed elements. The computer program product includes instructions operable to cause the computing device to calculate a total score for the first video segment based upon the value associated with each of the one or more analyzed elements. The computer program product includes instructions operable to cause the computing device to compare the total score for the first video segment to a score associated with a second video segment associated with the computing device. The computer program product includes instructions operable to cause the computing device to determine whether access to the secure resource is permitted based upon the comparison step.

Any of the above aspects can include one or more of the following features. In some embodiments, the analyzing step includes determining one or more characteristics associated with each of the one or more plurality of visual and audio elements, assigning a value to the characteristics based upon predetermined value information stored by the computing device, and storing the values for the characteristics. In some embodiments, the one or more characteristics include a position of a visual element, movement of a visual element, a color of a visual element, a type of a visual element, and an absence of a visual element. In some embodiments, the computing device performs a speech-to-text conversion on an audio element. In some embodiments, values are assigned to the characteristics based upon frequency of appearance within frames of the first video segment. In some embodiments, the predetermined value information is adjusted based upon preferences provided by a user of the computing device.

In some embodiments, the calculating step includes assigning a weight to one or more of the analyzed elements based upon a security profile at the computing device. In some embodiments, the comparing step further includes comparing the value associated with one of the analyzed elements in the first video segment to a value associated with an analyzed element in the second video segment, and determining a deviation value based upon the comparison of the analyzed element values. In some embodiments, the computing device aggregates the deviation value for the comparisons of each of the analyzed element values and determines whether the aggregated deviation value falls below a predetermined threshold.

In some embodiments, the plurality of visual and audio elements includes a visual representation of a user of the computing device. In some embodiments, the plurality of visual and audio elements includes an object in proximity to the user of the computing device. In some embodiments, the plurality of visual and audio elements includes a phrase spoken by the user of the computing device.

In some embodiments, the first video segment is captured using a camera connected to the computing device. In some embodiments, the computing device is a mobile device. In some embodiments, the secure resource is a website.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
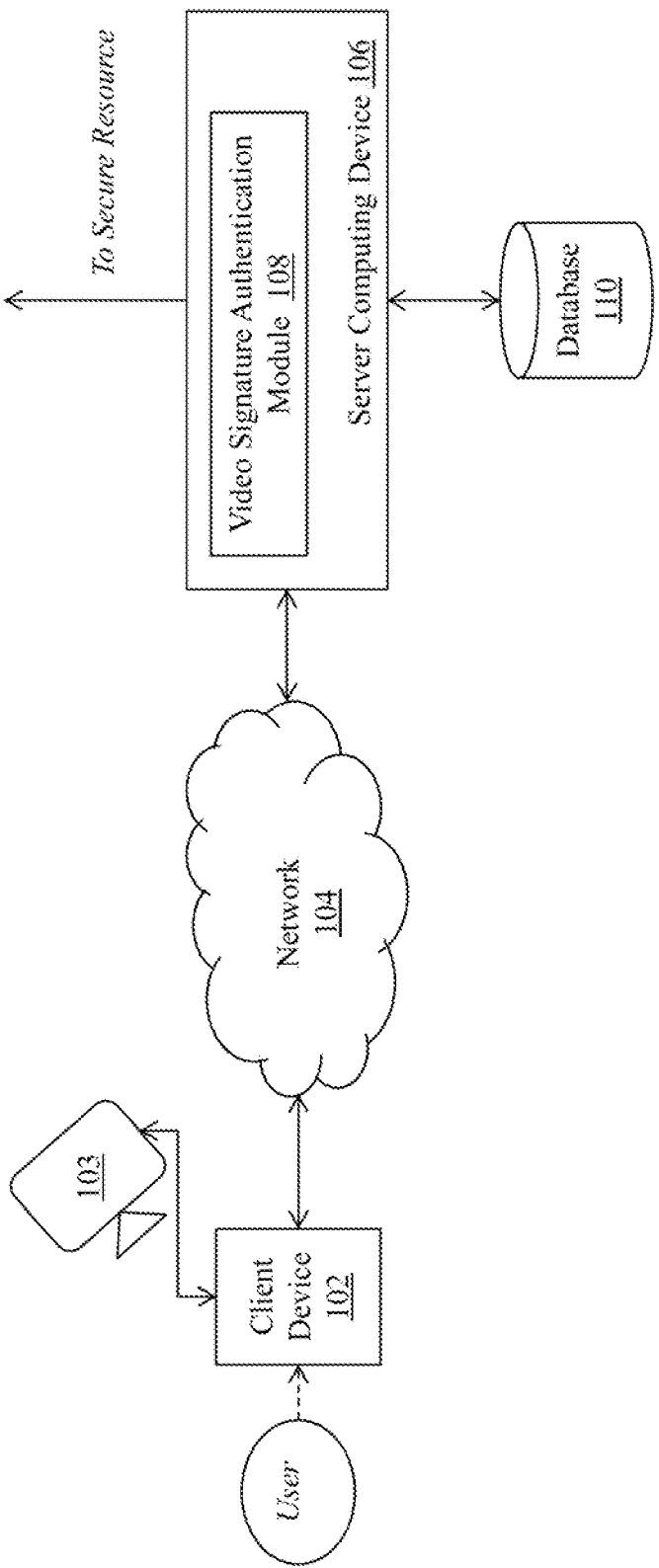
FIG. 1 is a block diagram of a system for authentication using a video signature, according to an embodiment of the invention.

FIG. 1 is a block diagram of a system 100 for authentication using a video signature, according to an embodiment of the invention. The system 100 includes a client computing device 102, a camera device 103 coupled to client device 102, a communications network 104, a server computing device 106 that includes a video signature authentication module 108, and a database 110.

The client device 102 connects to the server computing device 106 via the communications network 104 in order to authenticate a video signature captured by the client device 102. Exemplary client devices include desktop computers, laptop computers, tablets, mobile devices, smartphones, and internet appliances. It should be appreciated that other types of computing devices that are capable of connecting to the server computing device 106 can be used without departing from the scope of invention. Although FIG. 1 depicts one client device 102, it should be appreciated that the system 100 can include any number of client devices.

A camera device 103 is coupled to client device 102. The camera device can be any type of digital video camera (e.g., webcam) that is capable of capturing and transmitting video images of the user and/or the client device 102. As will be described in greater detail below, the camera device is configured to capture images of the user and the area surrounding the user for purposes of performing authentication of the user and/or the client device. In some embodiments, the camera device 103 is embedded in the client device 102, for example, a smartphone with an integrated camera or a laptop computer with an integrated webcam. Although FIG. 1 depicts one camera device 103, it should be understood that the system 100 can include any number of camera devices.

The communication network 104 enables the client device 102 to communicate with the server computing device 106 in order to perform authentication procedures. The network 104 may be a local network, such as a LAN, or a wide area network, such as the Internet and/or a cellular network. In some embodiments, the network 104 is comprised of several discrete networks and/or sub-networks (e.g., cellular Internet) that enable the client device 102 to communicate with the server computing device 106. It should be understood that the client device 102 can connect to the server computing device 106 via a wireless network (e.g., Bluetooth, WiFi, and so forth).

The server computing device 106 is a combination of hardware and software modules that authenticates a video signature captured by the client device 102 and enables access by the client device to a secure resource. The server computing device 106 includes a video signature authentication module 108. The module 108 is a hardware and/or software module that resides on the server computing device 106 to perform functions associated with authenticating the video signature provided by the client device 102. In some embodiments, the functionality of the module 108 is distributed among a plurality of computing devices. It should be appreciated that any number of computing devices, arranged in a variety of architectures, resources, and configurations (e.g., cluster computing, virtual computing, cloud computing) can be used without departing from the scope of the invention.

The system 100 also includes a database 110. The database 110 is coupled to the server computing device 106 and stores data used by the server computing device 106 to perform the video signature authentication functionality. The database 110 can be integrated with the server computing device 106 or be located on a separate computing device. An example database that can be used with the system 100 is MySQL™ available from Oracle Corp. of Redwood City, Calif.

Figure 2:
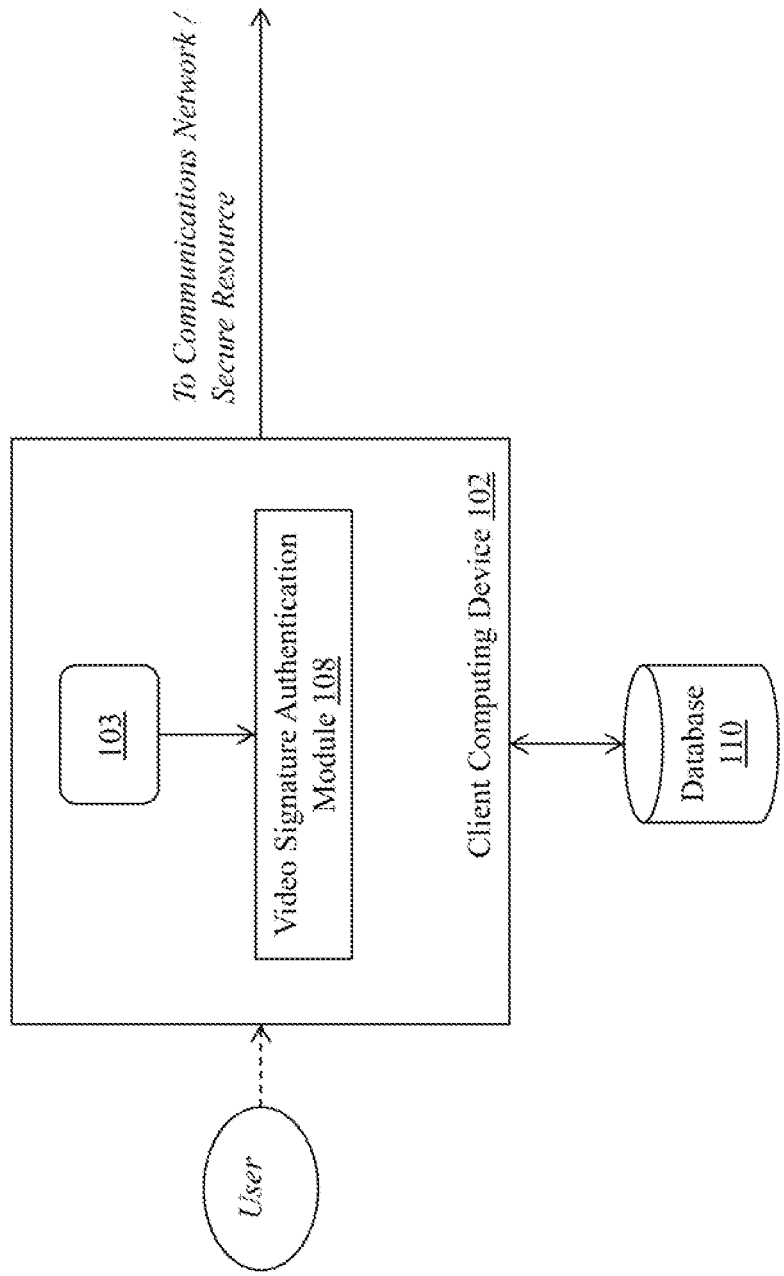
FIG. 2 is a block diagram of a system for authentication using a video signature, according to an embodiment of the invention.

FIG. 2 is a block diagram of a system 200 for authentication using a video signature, according to an embodiment of the invention. The system 200 of FIG. 2 is similar to the system 100 of FIG. 1; the system 200 includes client device 102, a camera device 103 coupled to client device 102, and a database 110. In FIG. 2, however, the client computing device 102 includes the video signature authentication module 108, enabling the client device to perform video signature authentication locally (i.e., without requiring traversal of the communications network 104 of FIG. 1). As shown in FIG. 2, the camera device 103 is embedded within the client device 102. It should be appreciated that other configurations of the client device 102 and camera device are contemplated within the scope of invention, such as a camera device 103 wirelessly connected to the client device 102.

Figure 3:
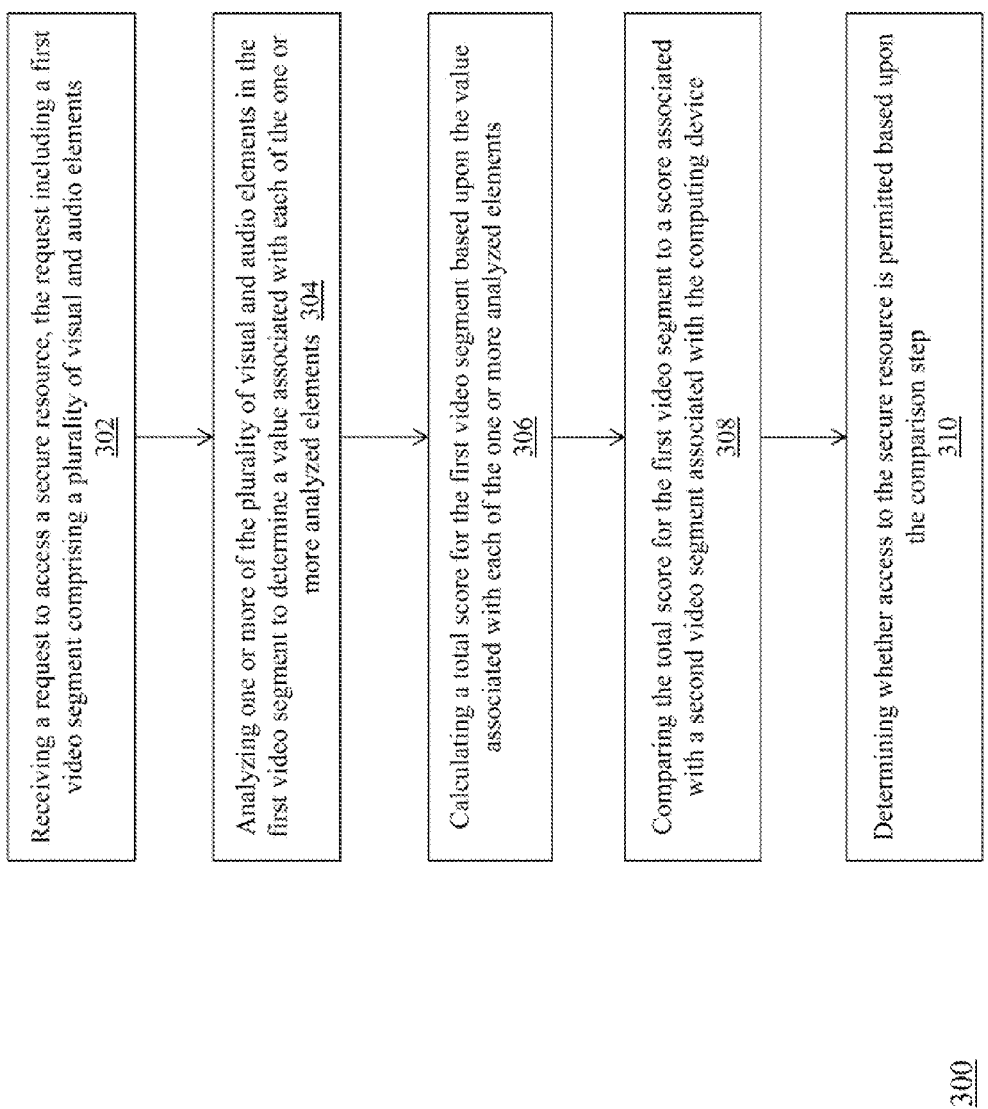
FIG. 3 is a flow diagram of a method for authentication using a video signature, according to an embodiment of the invention.

FIG. 3 is a flow diagram of a method 300 for authentication using a video signature, using the system 100 of FIG. 1. It should be appreciated that the system 200 of FIG. 2 can also be used to perform the method 300 depicted in FIG. 3.

The server computing device 106 receives (302) a request to access a secure resource. In one example, a secure resource is a website or other service that is protected from public access and requires the submission and verification of authentication credentials by a user seeking access to the secure resource. The process of authenticating the user involves verifying the user's identity.

For example, a user of client device 102 can navigate to a financial institution's website in order to log in to his or her account. Typically, such websites require that the user provides a form of authentication credential (e.g., username/password, token, and the like) before the user is granted access to the secure portions of the website where account information is available. It should be appreciated that other types of secure resources (e.g., databases, files, software) are included within the scope of invention.

As described herein, instead of or in addition to traditional authentication credentials, the server computing device 106 receives a new type of credential: a video segment captured by the client device 102 (e.g., using camera device 103 coupled to client device 102). Because video segments are multifaceted (i.e., typically including visual and audio elements), they can advantageously be used to generate a video signature—that is, a collection of distinct visual and audio elements represented in the video segment that are used to identify the associated user and can be compared to other video segments submitted by the user to authenticate the user's identity and allow access to the system.

The request to access a secure resource includes the captured video segment which comprises a plurality of visual and audio elements. Continuing with the above example, upon reaching the login page of the financial institution's website, the client device 102 captures a video segment and transmits the video segment to the server computing device as part of the authentication process. In some embodiments, the video segment is a single frame (i.e., image) or set of frames of video data captured by the camera device 103 that is used by the server computing device 106 to authenticate the user and/or the client device 102. The video segment can include any number of visual and audio elements that, when analyzed together, comprise the video signature for the video segment.

Figure 4:
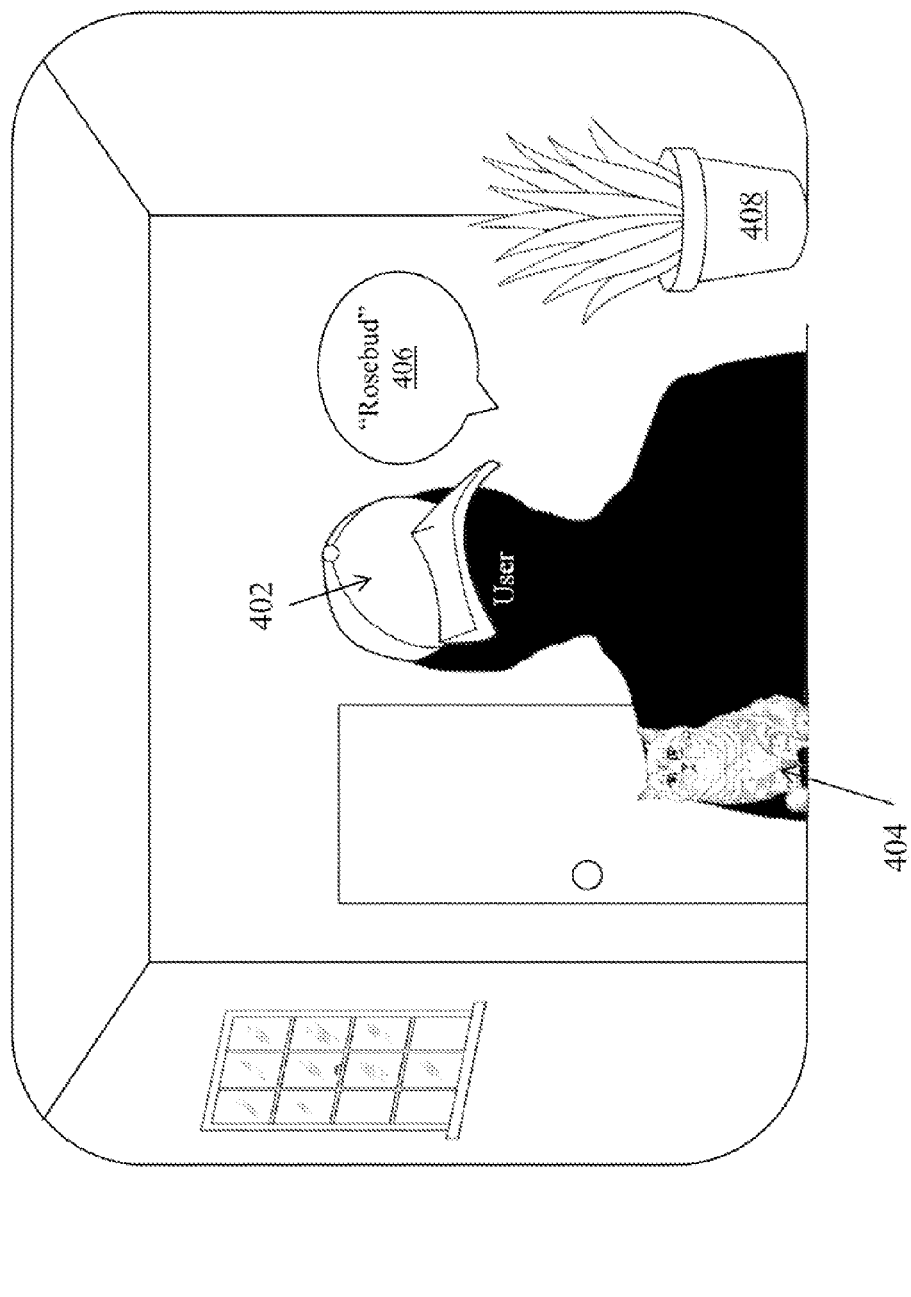
FIG. 4 is a diagram of an exemplary video segment to be analyzed to generate a video signature, according to an embodiment of the invention.

FIG. 4 is a diagram of an exemplary video segment 400 to be analyzed to generate a video signature, according to an embodiment of the invention. As shown in FIG. 4, the video segment comprises a video of the user wearing a baseball cap 402, holding a cat 404, saying the word "Rosebud" 406, with a potted plant 408 in the corner of the room. Each of the visual and audio elements 402, 404, 406 and 408 are used by the system 100 during the video signature authentication process. In addition, other elements of the video segment can be used for authentication, such as the user himself, apparel that the user is wearing, elements of the room (e.g., door, window), and so forth. For example, the module 108 can use facial recognition techniques to analyze the user and the result of such facial recognition methodology can be used as part of the total score for the video segment (as described in greater detail below). Other examples include voice recognition technology to analyze the user's speech patterns, speech-to-text conversion technology to isolate audio cues and/or spoken words within the video segment, and motion detection technology to track movement of the user and/or objects within the scene of the video segment. For example, if the user nods his head during the video segment, the module 108 can analyze the speed, position, and timing of the head movement as part of the overall analysis process described below.

Continuing with the method 300 of FIG. 3, the video signature authentication module 108 of server computing device 106 analyzes (304) one or more of the plurality of visual and audio elements 402, 404, 406, 408 in the first video segment 400 to determine a value associated with each of the one or more analyzed elements. As can be appreciated, the module 108 uses image and audio analysis algorithms/techniques to extract the various visual and audio elements from the video segment. For example, the module 108 can extract the shape of the baseball cap 402 from the video segment (or a single image of the video segment) and compare it to a database (e.g., database 110) of known shapes to determine a match. The module 108 can also analyze other characteristics associated with the visual and audio elements as part of the authentication process—such as color, position, and movement. For example, the module 108 determines that the baseball cap 402 is green and is positioned on top of the user's head.

Also, one or more of the visual and audio elements in the video segment can be assigned multiple values based upon different characteristics of the respective element. For example, the module 108 assigns the baseball cap a first value based upon its color (e.g., green) and assigns the baseball cap a second value based upon its position (e.g., on top of the user's head).

In some embodiments, the module 108 assigns a numeric value to each of the visual and audio elements 402, 404, 406, 408 represented in the video segment during the analysis step. Table One below depicts exemplary values assigned to each of the visual and audio elements 402, 404, 406 and 408:

TABLE ONE

| Visual/Audio Element | Assigned Value |
| --- | --- |
| Baseball cap | 10 |
| Green baseball cap | 15 |
| Baseball cap on user's head | 20 |
| Cat | 10 |
| White cat | 15 |
| Holding cat in right hand | 20 |
| Saying "Rosebud" | 25 |
| Potted plant | 10 |
| Plant in back corner of room | 20 |
| TOTAL SCORE | 145 |

After analyzing the video segment, the server computing device 106 calculates (306) a total score for the first video segment 400 based upon the value associated with each of the one or more analyzed elements. As shown in the table above, the total score for the video segment 400 is 145, based upon the summation of the individual visual and audio elements analyzed by the module 108. In some embodiments, certain visual and/or audio elements are weighted differently according to a predetermined security profile selected by the user and/or assigned by the module 108. For example, a financial institution may want to weigh the audio element 406 more heavily in the total score than a visual element (e.g., 408) because the institution can utilize speech recognition technology to identify the user with great precision (e.g., it may be harder for an impostor to duplicate a video segment that includes an audio element spoken by the user).

The module 108 stores the video segment and the associated values for each of the analyzed visual and audio elements in a database 110. The module 108 associates the stored data as a video signature for the particular user that submitted the video segment. Thus, the first time a video segment is submitted for analysis by client device 102, the module 108 stores the video segment and associated values as the video signature against which future video segment submissions from the user/client device are compared, similar to a username/password combination provided by a user.

When a user subsequently attempts to authenticate and gain access to a secure resource after providing a video segment, the module 108 compares (308) the total score for the earlier-provided video segment (i.e., the video segment that has been analyzed and stored by the system as described above) to a score associated with a second video segment associated with the client device 102 and/or user in order to identify and authenticate the user. For example, during a subsequent request to authenticate to the server computing device 106 and access a secure resource, the client device 102 submits a new video segment which is then analyzed by the module 108 (as previously described). In order to successfully authenticate, the total score of the newly-submitted video segment as calculated by the module 108 meets or exceeds a predetermined threshold when compared to the previously-stored video segment (e.g., segment 400).

Figure 5:
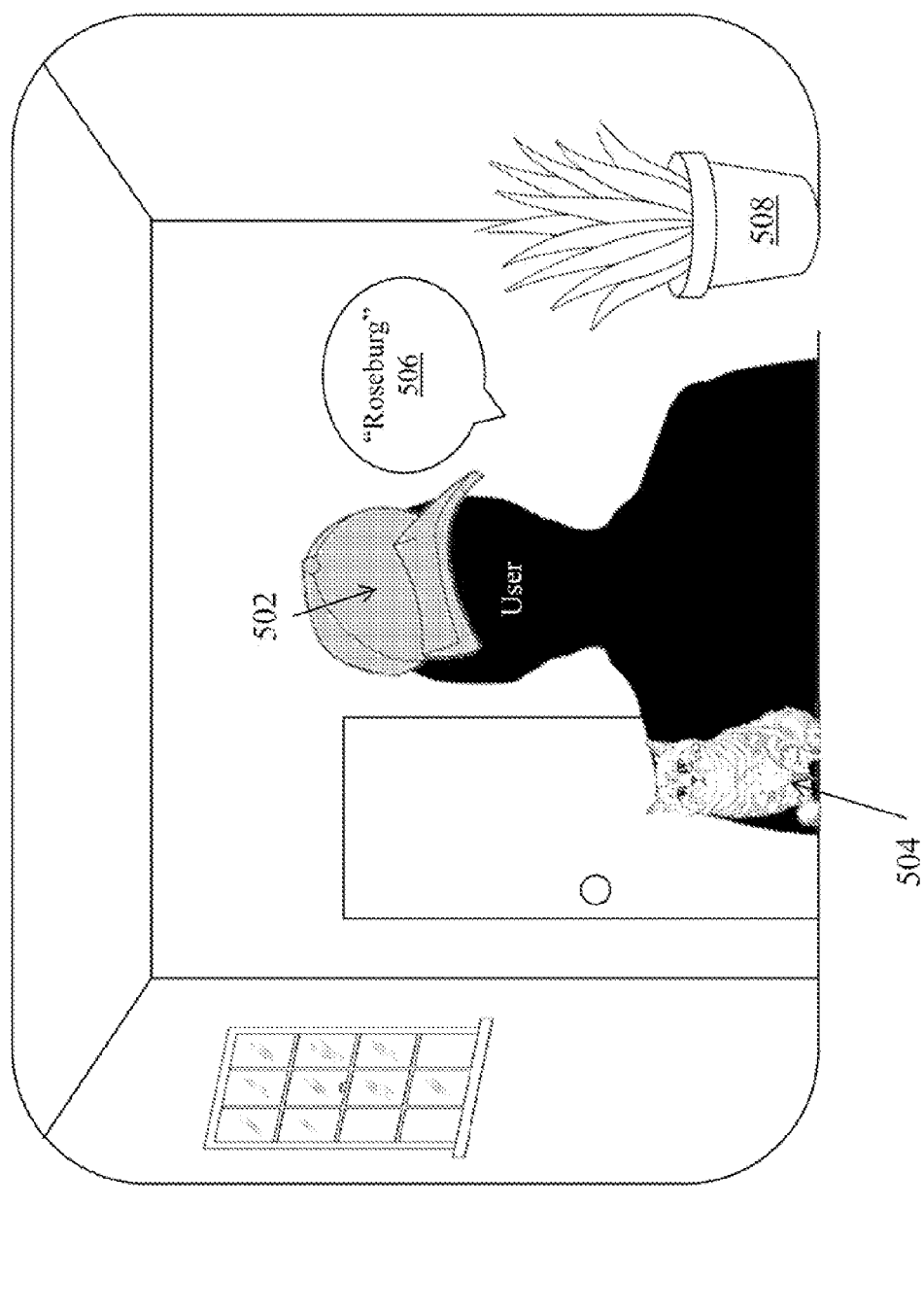
FIG. 5 is a diagram of an exemplary video segment to be authenticated using a video signature, according to an embodiment of the invention.

FIG. 5 is a diagram of an exemplary video segment 500 to be authenticated using a video signature, according to an embodiment of the invention. As shown in FIG. 5, the same user from FIG. 4 is present in the video segment. The video segment 500 includes a plurality of video and audio elements 502, 504, 506, 508: the user has an orange baseball cap 502 on top of his head, is holding a white cat 504 in his right hand, and is speaking the word "Roseburg" 506. Also, a potted plant 508 is positioned in the rear corner of the room.

The module 108 receives the video segment 500 from the client device 102 and analyzes the video segment 500 in the same manner as described previously. For example, the module 108 assigns a numeric value to each of the visual and audio elements 502, 504, 506, 508 represented in the video segment 500. During this process, the values assigned to the elements 502, 504, 506, 508 are further scaled by comparing them to the same elements 402, 404, 406, 408 as analyzed in the previously-stored video segment 400. Table Two below depicts exemplary values assigned to each of the visual and audio elements 502, 504, 506 and 508 and compared to the values previously assigned to the elements 402, 404, 406, 408 from the first video segment 400:

TABLE TWO

| Visual/Audio Element (Second Video Segment) | Assigned Value | Visual/Audio Element (First Video Segment) | Assigned Value |
|---|---|---|---|
| Baseball cap | 10 | Baseball cap | 10 |
| Orange baseball cap | 0 | Green baseball cap | 15 |
| Baseball cap on user's head | 20 | Baseball cap on user's head | 20 |
| Cat | 10 | Cat | 10 |
| White cat | 15 | White cat | 15 |
| Holding cat in right hand | 20 | Holding cat in right hand | 20 |
| Saying "Roseburg" | 10 | Saying "Rosebud" | 25 |
| Potted plant | 10 | Potted plant | 10 |
| Plant in back corner of room | 20 | Plant in back corner of room | 20 |
| TOTAL SCORE | 115 | TOTAL SCORE | 145 |

The module 108 determines a total score for the second video segment 500 to be one-hundred fifteen. The total score for the second video segment 500 is lower than the score for the previously-stored video segment 400 due to two main differences: a) the user is wearing an orange baseball cap, not a green cap; and b) the user is speaking the word "Roseburg" instead of "Rosebud." The differences result in the module 108 assigning a lower value to those two elements of the second video segment 500 (i.e., because they do not match the same characteristics of the elements as represented in the first video segment 400).

The module 108 determines (310) whether access to the secure resource is permitted based upon the comparison step. As shown in the table above, the module 108 determines that the total score for the second video segment 500 is within thirty points of the total score for the first video segment 400 (i.e., one-hundred fifteen to one-hundred forty-five). As a result, the module 108 can determine that the total score for the second segment 500 is sufficient to satisfy a predetermined threshold for permitting access to the secure resource. For example, the module 108 may determine that any total score for a submitted video segment that exceeds one hundred is sufficient to permit access.

In some embodiments, the user can provide certain scoring parameters or thresholds that provide some flexibility in the visual and audio elements required to be present in video segments submitted for authentication. For example, the user may prefer that the color of the baseball cap 402 is not used during the analysis and authentication process—so that he can wear any baseball cap he might have available and still be able to authenticate to the system.

In some embodiments, the module 108 evaluates each of the visual and audio elements individually as part of the determination process to calculate a deviation value for the respective elements. For example, the module 108 may determine that, because only two of the nine values for the visual and audio elements in the second video segment 500 fall more than ten points below the corresponding elements in the first video segment 400 (i.e., a deviation value of ten), the second video segment 500 is sufficient to authenticate the user/client device 102. In another example, the module 108 may require that every visual and audio element in the second video segment 500 fall within at least eight points of the corresponding element in the first video segment 400 in order to permit access to the secure resource. Table Three below depicts exemplary values assigned to each of the visual and audio elements 502, 504, 506 and 508 and compared to the values previously assigned to the elements 402, 404, 406, 408 from the first video segment 400, including a deviation value for each element comparison:

TABLE THREE

| Visual/Audio Element (Second Video Segment) | Assigned Value | Visual/Audio Element (First Video Segment) | Assigned Value | Deviation Value |
|---|---|---|---|---|
| Baseball cap | 10 | Baseball cap | 10 | 0 |
| Orange baseball cap | 0 | Green baseball cap | 15 | 15 |
| Baseball cap on user's head | 20 | Baseball cap on user's head | 20 | 0 |
| Cat | 10 | Cat | 10 | 0 |
| White cat | 15 | White cat | 15 | 0 |
| Holding cat in right hand | 20 | Holding cat in right hand | 20 | 0 |
| Saying "Roseburg" | 10 | Saying "Rosebud" | 25 | 15 |
| Potted plant | 10 | Potted plant | 10 | 0 |
| Plant in back corner of room | 20 | Plant in back corner of room | 20 | 0 |
| TOTAL SCORE | 115 | TOTAL SCORE | 145 | |

The aggregate deviation value between the elements of the two video segments is thirty, while the average deviation value is 3.33. In some examples, the module 108 can use the average deviation value to determine whether access to the secure resource is permitted while in other examples, the aggregated deviation value can be used. As can be appreciated, a variety of scoring and comparison techniques can be used without departing from the scope of the invention.

Figure 6:
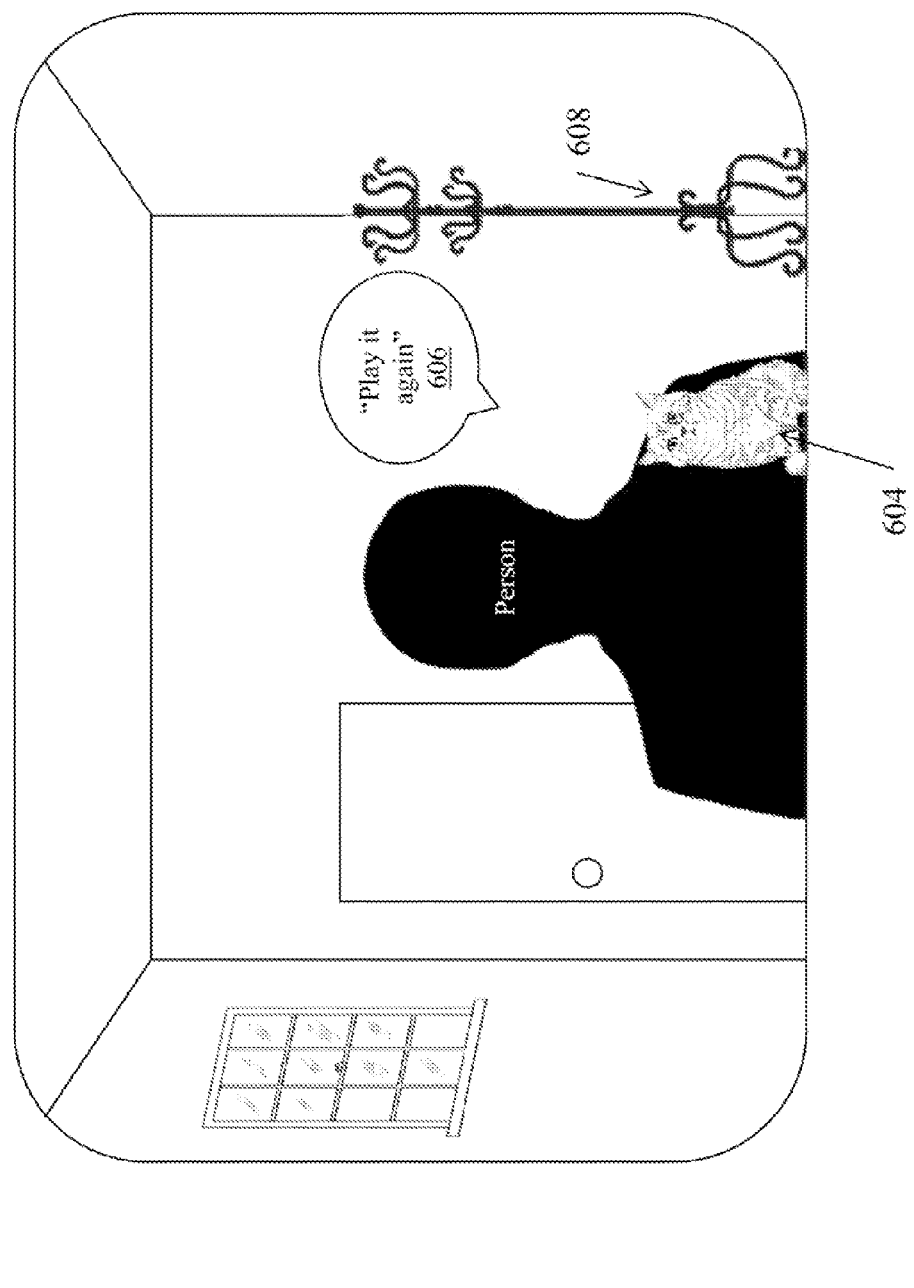
FIG. 6 is a diagram of another exemplary video segment to be authenticated using a video signature, according to an embodiment of the invention.

FIG. 6 is a diagram of another exemplary video segment 600 to be authenticated using a video signature, according to an embodiment of the invention. As shown in FIG. 6, the third video segment 600 includes a plurality of video and audio elements 604, 606, 608: a person is holding a white cat 604 in his left hand and is speaking the words "Play it again" 606. Also, a coat rack 608 is positioned in the rear corner of the room. The person in FIG. 6 is not wearing a hat.

The module 108 receives the third video segment 600 from the client device 102 and analyzes the video segment 600 in the same manner as described previously. For example, the module 108 assigns a numeric value to each of the visual and audio elements 604, 606, 608 represented in the video segment 600. During this process, the values assigned to the elements 604, 606, 608 are further scaled by comparing them to the same elements 402, 404, 406, 408 as analyzed in the previously-stored video segment 400. Table Four below depicts exemplary values assigned to each of the visual and audio elements 604, 606, 608 in video segment 600 and compared to the values previously assigned to the elements 402, 404, 406, 408 from the first video segment 400:

TABLE FOUR

| Visual / Audio Element (Third Video Segment) | Assigned Value | Visual/Audio Element (First Video Segment) | Assigned Value |
|---|---|---|---|
| No baseball cap | 0 | Baseball cap | 10 |
| No baseball cap | 0 | Green baseball cap | 15 |
| No baseball cap | 0 | Baseball cap on user's head | 20 |
| Cat | 10 | Cat | 10 |
| White cat | 15 | White cat | 15 |
| Holding cat in left hand | 5 | Holding cat in right hand | 20 |
| Saying "Play it again" | 0 | Saying "Rosebud" | 25 |
| Coat rack | 0 | Potted plant | 10 |
| Coat rack in back corner of room | 5 | Plant in back corner of room | 20 |
| TOTAL SCORE | 35 | TOTAL SCORE | 145 |

The module 108 determines a total score for the third video segment 600 to be thirty-five. The total score for the third video segment 600 is significantly lower than the score for the previously-stored video segment 400 due to many differences between the two segments: a) the absence of a baseball cap, b) the cat positioned in the wrong hand, c) the person speaking the wrong phrase, and d) the wrong object being positioned in the corner of the room. In this example, an impostor may be trying to gain access to the secure resource by attempting to pass himself off as the user by submitting a fraudulent video segment (just as someone may attempt to learn a user's password by making attempts using random character strings). Because the total score for the third video segment 600 is far below the total score for the first video segment 400, the module 108 denies the request to access the secure resource and does not authenticate the person/client device 102 to the system.

In some embodiments, if the submitted video segment does not meet or exceed a predetermined threshold for permitting access to the secure resource, the module 108 can offer other authentication means to the user so that such access may be granted. For example, the module 108 can prompt the user and/or client device 102 for an auxiliary authentication credential (e.g., biometric information, device footprint, token, public/private key information, and the like) in order to verify the identity of the user.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, 3G, 4G, 4G LTE, 5G, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for authentication using a video signature, the method comprising:

receiving, by a computing device from a remote device associated with a user, a request to access a secure resource, the request including a first video segment comprising a plurality of visual and audio elements, wherein at least a first one of the visual elements comprises a physical characteristic of the user, at least a second one of the visual elements comprises a physical object in proximity to the user, and at least a third one of the visual elements comprises an element of the environment surrounding the user;

determining, by the computing device, a plurality of characteristics associated with each of the plurality of visual and audio elements;

assigning, by the computing device, a value to each of the characteristics based upon predetermined value information stored by the computing device;

calculating, by the computing device, a total score for the first video segment based upon the value associated with each of the characteristics;

comparing, by the computing device, the total score for the first video segment to a score associated with a second video segment previously received from the remote device;

determining, by the computing device, whether to permit the remote device to access the secure resource based upon the comparison step; and connecting, by the computing device, the remote device to the secure resource if access is permitted.

2. The method of claim 1, further comprising:

storing, by the computing device, the values for each of the characteristics in a database coupled to the computing device.

3. The method of claim 2, wherein the plurality of characteristics includes at least two of: a position of a visual element, movement of a visual element, a color of a visual element, a type of a visual element, and an absence of a visual element.

4. The method of claim 1, further comprising performing, by the computing device, a speech-to-text conversion on an audio element.

5. The method of claim 1, wherein the values are assigned to the characteristics based upon frequency of appearance within frames of the first video segment.

6. The method of claim 1, wherein the predetermined value information is adjusted based upon preferences received from the remote device.

7. The method of claim 1, wherein the calculating step includes assigning, by the computing device, a weight to one or more of the characteristics based upon a security profile at the computing device.

8. The method of claim 1, the comparing step further comprising:

comparing, by the computing device, the value associated with one of the characteristics in the first video segment to a value associated with a corresponding characteristic of the same element in the second video segment; and determining, by the computing device, a deviation value based upon the comparison of the characteristic values.

9. The method of claim 8, further comprising:

aggregating, by the computing device, the deviation value for the comparisons of each of the characteristic values; and determining, by the computing device, whether the aggregated deviation value falls below a predetermined threshold.

10. The method of claim 1, wherein the plurality of visual and audio elements include a phrase spoken by the user.

11. The method of claim 1, wherein the first video segment is captured using a camera connected to the remote device.

12. The method of claim 1, wherein the remote device is a mobile device.

13. The method of claim 1, wherein the secure resource is a website.

14. A system for authentication using a video signature, the system comprising a computing device configured to:

receive, from a remote device associated with a user, a request to access a secure resource, the request including a first video segment comprising a plurality of visual and audio elements, wherein at least a first one of the visual elements comprises a physical characteristic of the user, at least a second one of the visual elements comprises a physical object in proximity to the user, and at least a third one of the visual elements comprises an element of the environment surrounding the user;

determine a plurality of characteristics associated with each of the plurality of visual and audio elements;

assign a value to each of the characteristics based upon predetermined value information stored by the computing device;

calculate a total score for the first video segment based upon the value associated with each of the characteristics;

compare the total score for the first video segment to a score associated with a second video segment previously received from the remote device;

determine whether to permit the remote device to access the secure resource based upon the comparison step; and connect the remote device to the secure resource if access is permitted.

15. The system of claim 14, wherein the computing device is further configured to:

store the values for each of the characteristics in a database coupled to the computing device.

16. The system of claim 14, wherein the plurality of characteristics includes two or more of: a position of a visual element, movement of a visual element, a color of a visual element, a type of a visual element, and an absence of a visual element.

17. The system of claim 14, a wherein the computing device is further configured to perform speech-to-text conversion on an audio element.

18. The system of claim 14, wherein the values are assigned to the characteristics based upon frequency of appearance within frames of the first video segment.

19. The system of claim 14, wherein the predetermined value information is adjusted based upon preferences received from the remote device.

20. The system of claim 14, wherein the calculating step includes assigning a weight to one or more of the characteristics based upon a security profile at the computing device.

21. The system of claim 14, the comparing step further comprising:

comparing the value associated with one of the analyzed elements in the first video segment to a value associated with a corresponding characteristic of the same element in the second video segment; and determining a deviation value based upon the comparison of the characteristic values.

22. The system of claim 21, the comparing step further comprising:

aggregate the deviation value for the comparisons of each of the characteristic values; and determine whether the aggregated deviation value falls below a predetermined threshold.

23. The system of claim 14, wherein the plurality of visual and audio elements include a phrase spoken by the user.

24. The system of claim 14, wherein the first video segment is captured using a camera connected to the remote device.

25. The system of claim 14, wherein the remote device is a mobile device.

26. A computer program product, tangibly embodied in a non-transitory computer readable storage medium, for authentication using a video signature, the computer program product including instructions operable to cause a computing device to:

receive, from a remote device associated with a user, a request to access a secure resource, the request including a first video segment comprising a plurality of visual and audio elements, wherein at least a first one of the visual elements comprises a physical characteristic of the user, at least a second one of the visual elements comprises a physical object in proximity to the user, and at least a third one of the visual elements comprises an element of the environment surrounding the user;

determine a plurality of characteristics associated with each of the plurality of visual and audio elements;

assign a value to each of the characteristics based upon predetermined value information stored by the computing device;

calculate a total score for the first video segment based upon the value associated with each of the characteristics;

compare the total score for the first video segment to a score associated with a second video segment previously received from the remote device;

determine whether to permit the remote device to access the secure resource based upon the comparison step; and connect the remote device to the secure resource if access is permitted.

* * * * *